(12) United States Patent
Niu et al.

(10) Patent No.: US 11,420,892 B2
(45) Date of Patent: Aug. 23, 2022

(54) OIL SLUDGE PYROLYSIS DEVICE

(71) Applicant: NIUTECH ENVIRONMENT TECHNOLOGY CORPORATION, Shandong (CN)

(72) Inventors: Xiaolu Niu, Jinan (CN); Guoqian Han, Jinan (CN); Haimin Zhang, Jinan (CN); Zongcai Li, Jinan (CN); Jie Niu, Jinan (CN); Lanying Tong, Jinan (CN); Shengyu Shi, Jinan (CN); Feng Lu, Jinan (CN); Bin Niu, Jinan (CN)

(73) Assignee: NIUTECH ENVIRONMENT TECHNOLOGY CORPORATION, Jinan (CN)

( * ) Notice: Subject to any disclaimer, the term of this patent is extended or adjusted under 35 U.S.C. 154(b) by 0 days.

(21) Appl. No.: 17/265,389

(22) PCT Filed: Feb. 18, 2019

(86) PCT No.: PCT/CN2019/075309
§ 371 (c)(1),
(2) Date: Feb. 2, 2021

(87) PCT Pub. No.: WO2020/034611
PCT Pub. Date: Feb. 20, 2020

(65) Prior Publication Data
US 2022/0112114 A1    Apr. 14, 2022

(30) Foreign Application Priority Data
Aug. 13, 2018   (CN) .......................... 201810916528.1

(51) Int. Cl.
*C10B 47/44*   (2006.01)
*C02F 11/10*   (2006.01)
(Continued)

(52) U.S. Cl.
CPC .............. *C02F 11/10* (2013.01); *C10B 47/44* (2013.01); *C10B 49/20* (2013.01); *C10B 51/00* (2013.01);
(Continued)

(58) Field of Classification Search
CPC ......... C02F 11/10; C10B 49/04; C10B 49/16; C10B 49/20; C10B 47/44; C10B 51/00;
(Continued)

(56) References Cited

U.S. PATENT DOCUMENTS 1,712,082 A * 5/1929 Koppers .................. C10B 49/16
                                                        201/20
2,321,185 A * 6/1943 Christian ............. B65G 33/265
                                                        415/72

(Continued)

FOREIGN PATENT DOCUMENTS

CN        101074385 A       11/2007
CN        103387841 A       11/2013
(Continued)

OTHER PUBLICATIONS

May 16, 2019 International Search Report issued in International Patent Application No. PCT/CN2019/075309.

*Primary Examiner* — Jonathan Luke Pilcher
(74) *Attorney, Agent, or Firm* — Oliff PLC

(57) ABSTRACT

An oil sludge pyrolysis device, including an outer cylinder body and an inner cylinder body, a spiral conveyor belt being provided on an inner wall of the inner cylinder body, and thermally conductive pipes being provided on the spiral conveyor belt. The device enlarges the heat exchange area during oil sludge pyrolysis, improves the heat exchange efficiency and the heat utilization rate, and increases the pyrolysis speed of oil sludge at a low temperature.

4 Claims, 1 Drawing Sheet

(51) Int. Cl.
  *C10B 49/20* (2006.01)
  *C10B 51/00* (2006.01)
  *C10B 55/00* (2006.01)
  *C10B 55/08* (2006.01)
  *C10G 1/02* (2006.01)
  *C02F 101/32* (2006.01)
  *C02F 103/36* (2006.01)

(52) U.S. Cl.
  CPC .............. *C10B 55/00* (2013.01); *C10B 55/08* (2013.01); *C10G 1/02* (2013.01); *C02F 2101/32* (2013.01); *C02F 2103/365* (2013.01); *C10G 2300/1003* (2013.01)

(58) Field of Classification Search
  CPC .... C10B 1/10; C10G 9/02; C10G 9/04; C10G 9/28; C10G 11/14; F28F 5/02; F28F 5/04; F28F 5/06; B65G 33/24; B65G 33/26; B65G 33/265; B65G 33/30
  See application file for complete search history.

(56) References Cited

U.S. PATENT DOCUMENTS

| | | | | |
|---|---|---|---|---|
| 3,529,661 | A * | 9/1970 | Thomas | F28F 5/06 165/92 |
| 8,444,828 | B2 * | 5/2013 | Wolfe | F23G 5/0273 201/15 |
| 2008/0149471 | A1 * | 6/2008 | Wolfe | F23G 5/0273 201/8 |

FOREIGN PATENT DOCUMENTS

| | | |
|---|---|---|
| CN | 107796196 A | 3/2018 |
| CN | 108911458 A | 11/2018 |
| JP | 2001-165572 A | 6/2001 |
| JP | 2002-030179 A | 1/2002 |

\* cited by examiner

OIL SLUDGE PYROLYSIS DEVICE

TECHNICAL FIELD

The present invention belongs to the technical field of environmental protection, and specifically relates to an oil sludge pyrolysis device.

BACKGROUND TECHNOLOGY

Oil sludge is the abbreviation of sludge containing oil, which is the solid waste containing oil produced in oil exploitation, transportation, refining and the process of oily wastewater treatment. In general, the oil content in oil sludge is 10-50% or even higher, while the water content is above 30%. In China's petrochemical industry, more than 800,000 tons of oily sludge is produced annually on average, and the treatment of this part of sludge is a long-term problem in China's petrochemical field. At present, domestic and overseas sewage oil sludge treatment technologies include more than ten kinds of processing methods including landfill, profile control injection into the formation, solidification treatment, thermal desorption, solvent extraction, incineration coking pyrolysis, biological treatment, and comprehensive utilization, etc. However, many of the above methods face the problems such as high processing cost, complex processing equipment, low efficiency and secondary pollution in practical large-scale industrial applications, all of which greatly limit their further use. It is a good choice to treat oil sludge by high-temperature pyrolysis. However, due to oil sludge has the features of high oil content, high viscosity, fine particles and difficulty in dehydration, prior art is in lack of corresponding effective oil sludge pyrolysis equipment.

CONTENT OF INVENTION

In view of the above problem, the invention provides an oil sludge pyrolysis device, by using this invention, the heat exchange area in the oil sludge pyrolysis process can be enlarged, the heat exchange efficiency can be improved, further the oil sludge pyrolysis speed can be improved, thus realizing the full pyrolysis of oil sludge.

The specific technical scheme of the invention is: an oil sludge pyrolysis device, comprising an outer cylinder body and an inner cylinder body, a spiral conveyor belt being provided on an inner wall of the inner cylinder body, and thermally conductive pipes being provided on the spiral conveyor belt.

During the working process, the oil sludge to be pyrolysed enters the inner cylinder body of the pyrolysis device and runs to the discharge port under the action of the spiral conveyor belt, and pyrolysis is carried out at the same time. The inner wall of the inner cylinder body is provided with a spiral conveyor belt, the spiral conveyor belt is provided with the thermally conductive pipes, during the operation process of the spiral belt pushing the material, when the material contacts with the thermally conductive pipes, the thermally conductive pipes provide contact heat for material pyrolysis; when the material and the thermally conductive pipes do not contact, the thermally conductive pipes provide radiant heat for material pyrolysis.

Further, a plurality of thermally conductive pipes are evenly arranged on each screw pitch of the spiral conveyor belt. It is preferable to have three thermally conductive pipes evenly arranged on each screw pitch. The thermally conductive pipes are arranged along the rotation direction of the spiral conveyor belt to provide more heat for the materials to be pyrolysed and increase the heating area of the materials to be pyrolysed. In addition, the heating area of the material is increased and the utilization rate of heat is greatly improved due to the full use of heat, further the pyrolysis temperature of oil sludge is reduced to a certain extent. The decrease of pyrolysis temperature helps avoid coke formation and extend the service life of the equipment.

As the oil sludge to be pyrolysed has high moisture content and is viscous, the solid heat carrier is dispersed in the inner cylinder body of the invention. The solid heat carrier is a metal sphere or a non-metal sphere. The oil sludge to be pyrolysed can be evenly wrapped on the surface of the solid heat carrier after being mixed with a solid heat carrier, which makes the oil sludge relatively dispersed and increases the heating area of the oil sludge, making it easier for pyrolysis. In addition, because there is a solid heat carrier in the inner cylinder body, in the pyrolysis process, there is a relative movement between the solid heat carrier and the inner cylinder body, which plays a certain role in clearing coke formation and avoiding the occurrence of coke formation, and further improves the service life of the equipment. The diameter of the aforesaid sphere is 5-50 mm.

The thermally conductive pipes are hollow pipes, and the heat source comes from the hot air in the hot air chamber between the outer cylinder body and the inner cylinder body. The thermally conductive pipes are connected with the hot air chamber. With the movement of the spiral conveyor belt, the thermally conductive pipes also move. When the thermally conductive pipes are rotated to a suitable angle, the hot air enters the thermally conductive pipes. When the thermally conductive pipes are rotated to other angles, the hot air comes out of the thermally conductive pipes, thus realizing continuous heat exchange.

After the above pyrolysis, the oil sludge is pyrolysed into high temperature oil gas, water vapor and solid products. Liquid products and a small amount of combustible gas are obtained after cooling high temperature oil gas and water vapor. The liquid products are transported to the tank area by an oil pump. The purified combustible gas is used as fuel for pyrolysis heating. The flue gas produced by the production line is discharged after being purified up to the standard by a flue gas purification system. The solid products obtained from pyrolysis is cooled to a safe temperature and then transported to the solid product silo for temporary storage.

In summary, by using of the oil sludge pyrolysis device described in this invention, the heat exchange area in the oil sludge pyrolysis process is expanded and the heat exchange efficiency is improved, which greatly improves heat utilization rate, speeds up the pyrolysis speed of the oil sludge at a lower temperature, realizes the full recovery of the fossil oil in the oil sludge, and makes the residual oil amount in the treated soil reach the national standards. Further, the reduction, harmless and resource-based treatment and application of oil sludge are realized without secondary pollution. The device is economical, environmentally friendly and safe.

SPECIFIC EMBODIMENTS

Embodiment 1

Figure 1:
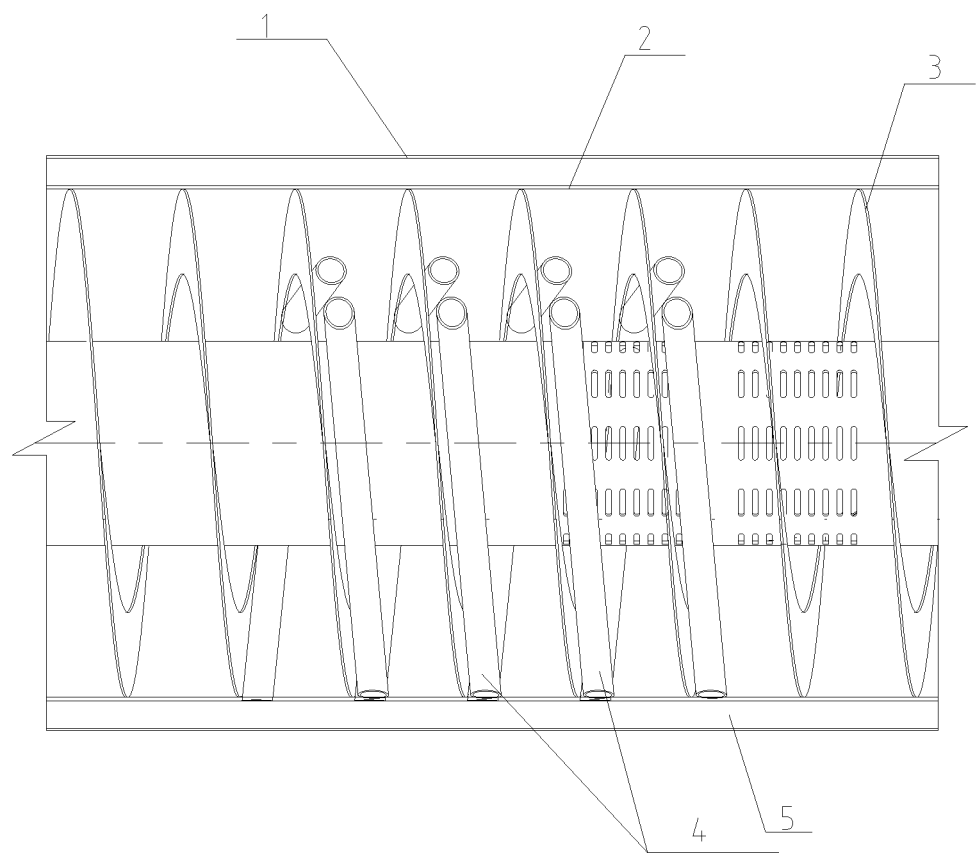
FIG. 1 is the structural diagram of the invention.
Figure 2:
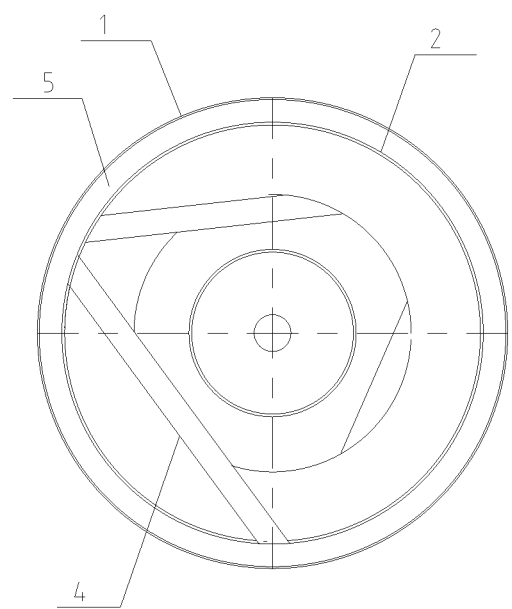
FIG. 2 is the left view of FIG. 1.
Wherein, 1. the outer cylinder body, 2. the inner cylinder body, 3. the spiral conveyor belt, 4. the thermally conductive pipes, 5. the hot air chamber.

An oil sludge pyrolysis device, comprising an outer cylinder body and an inner cylinder body, a spiral conveyor belt being provided on an inner wall of the inner cylinder body, and thermally conductive pipes being provided on the spiral conveyor belt.

The thermally conductive pipes are hollow pipes.

A solid heat carrier is dispersed in the inner cylinder body.

Embodiment 2

An oil sludge pyrolysis device, comprising an outer cylinder body and an inner cylinder body, a spiral conveyor belt being provided on an inner wall of the inner cylinder body, and thermally conductive pipes being provided on the spiral conveyor belt.

Thermally conductive pipes are evenly arranged on each screw pitch of the spiral conveyor belt. A thermally conductive pipe is arranged on each screw pitch.

The thermally conductive pipes are hollow pipes.

A solid heat carrier is dispersed in the inner cylinder body.

The solid heat carrier is a non-metal sphere.

A diameter of the non-metal sphere is 5-25 mm.

Embodiment 3

An oil sludge pyrolysis device, comprising an outer cylinder body and an inner cylinder body, a spiral conveyor belt being provided on an inner wall of the inner cylinder body, and thermally conductive pipes being provided on the spiral conveyor belt.

Thermally conductive pipes are evenly arranged on each screw pitch of the spiral conveyor belt. Two thermally conductive pipes are arranged on each screw pitch.

The thermally conductive pipes are hollow pipes.

A solid heat carrier is dispersed in the inner cylinder body.

The solid heat carrier is a metal sphere.

A diameter of the metal sphere is 5-50 mm.

Embodiment 4

An oil sludge pyrolysis device, comprising an outer cylinder body 1 and an inner cylinder body 2, a spiral conveyor 3 being provided on an inner wall of the inner cylinder body 2, and thermally conductive pipes 4 being provided on the spiral conveyor belt 3.

Thermally conductive pipes 4 are evenly arranged on each screw pitch of the spiral conveyor belt 3.

Three thermally conductive pipes 4 are evenly arranged on each screw pitch, the thermally conductive pipes 4 are arranged along the rotation direction of the spiral conveyor belt.

The thermally conductive pipes 4 are hollow pipes.

A solid heat carrier is dispersed in the inner cylinder body 2.

The solid heat carrier is a metal sphere.

A diameter of the metal sphere is 5-50 mm.

The invention claimed is:

1. An oil sludge pyrolysis device, comprising an outer cylinder body and an inner cylinder body, and a spiral conveyor belt being provided on an inner wall of the inner cylinder body, wherein:
   the inner cylinder body has a circular cross section,
   a plurality of thermally conductive pipes are provided on the spiral conveyor belt,
   three or more of the plurality of thermally conductive pipes are evenly arranged on each screw pitch of the spiral conveyor belt such that each of said three or more of the plurality of thermally conductive pipes forms a separate chord of the circular cross section,
   the plurality of thermally conductive pipes are arranged along a rotation direction of the spiral conveyor belt,
   the plurality of thermally conductive pipes are hollow pipes,
   the plurality of thermally conductive pipes are connected with a hot air chamber, and
   the hot air chamber is arranged between the outer cylinder body and the inner cylinder body.

2. The oil sludge pyrolysis device according to claim 1, wherein a solid heat carrier is dispersed in the inner cylinder body.

3. The oil sludge pyrolysis device according to claim 2, wherein the solid heat carrier is a metal sphere or a non-metal sphere.

4. The oil sludge pyrolysis device according to claim claim 3, wherein a diameter of the sphere is 5-50 mm.

* * * * *